Oct. 7, 1958 E. H. LAND 2,855,302
PHOTOGRAPHIC FILM UNIT
Filed Dec. 23, 1955 3 Sheets-Sheet 1
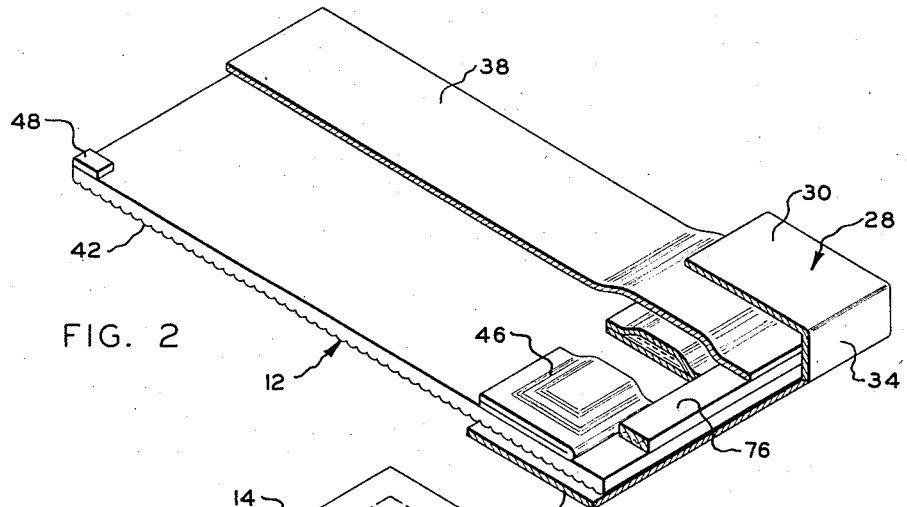
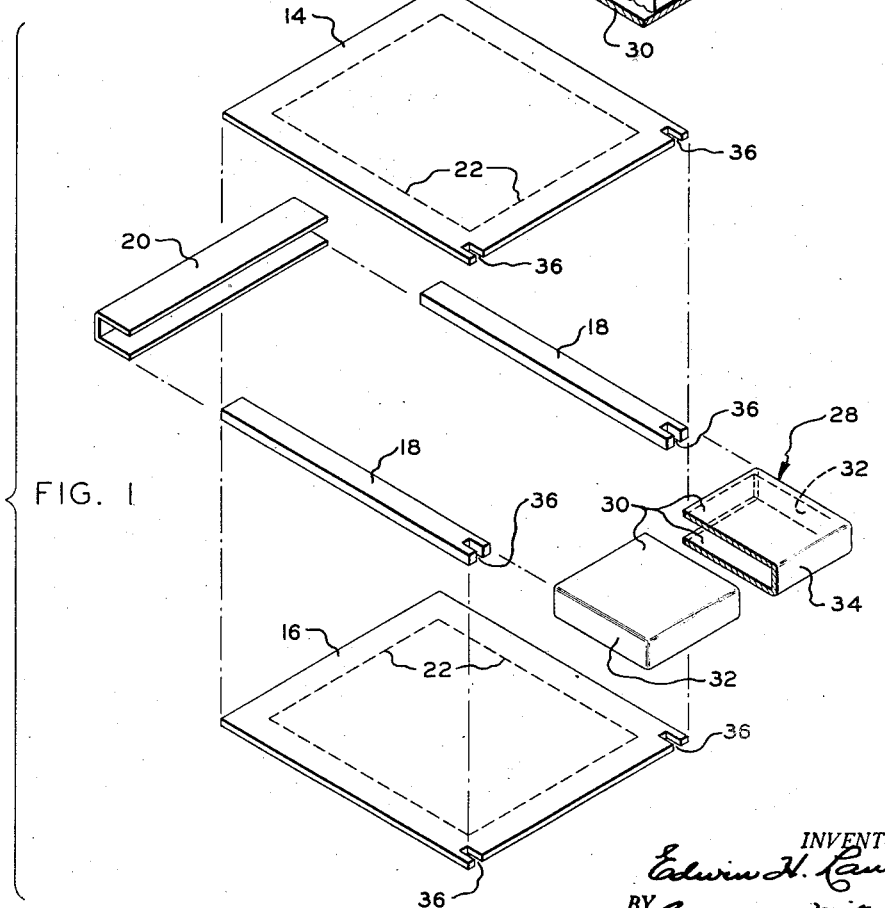
INVENTOR.
Edwin H. Land
BY Browneld Mikulka
and
Robert E. Corb
ATTORNEYS Oct. 7, 1958 E. H. LAND 2,855,302
PHOTOGRAPHIC FILM UNIT
Filed Dec. 23, 1955 3 Sheets-Sheet 2

INVENTOR.
Edwin H. Land
BY Brown, Mikulka
and
Robert E. Corb
ATTORNEYS

Oct. 7, 1958 — E. H. LAND — 2,855,302
PHOTOGRAPHIC FILM UNIT
Filed Dec. 23, 1955 — 3 Sheets-Sheet 3

INVENTOR.
Edwin H. Land
BY Broward Mikulka
and Robert E. Corb
ATTORNEYS

# United States Patent Office 2,855,302
Patented Oct. 7, 1958

2,855,302

PHOTOGRAPHIC FILM UNIT

Edwin H. Land, Cambridge, Mass., assignor to Polaroid Corporation, Cambridge, Mass., a corporation of Delaware Application December 23, 1955, Serial No. 555,059

12 Claims. (Cl. 96—76)

This invention relates to photographic products and particularly to a novel film pack including a processing liquid.

It has heretofore been proposed to distribute a processing liquid on a photosensitive stratum, and preferably in a layer between the photosensitive stratum and another stratum superposed therewith, and immediately thereafter photoexpose the photosensitive stratum to form a latent image which is developed by the processing liquid. This process may be effected by a film unit comprising a photosensitive sheet, another sheet superposed with the photosensitive sheet and means containing a processing liquid for distribution between the two sheets during movement of the film unit into exposure position in a camera. Then, almost immediately as the film unit is located in exposure position, the photosensitive sheet is photoexposed to produce a latent image from which a visible image is formed preferably by a silver transfer-reversal process which is commenced by photoexposure of the photosensitive sheet. One of the sheets of the film unit is preferably transparent and provides a support for the visible image in the film unit following exposure.

An object of the present invention is to provide a novel film pack including a film unit comprising a photosensitive sheet, another sheet and means containing a processing liquid for distribution between the two sheets immediately prior to exposure of the photosensitive sheet in a camera.

The herein disclosed film pack is adapted for use with a camera of the same general type disclosed in the co-pending application of Edwin H. Land, Serial No. 463,-848, filed October 22, 1954, Patent No. 2,819,662, and including an exposure and processing chamber within which the film unit is positioned during exposure and processing, means for photoexposing the photosensitive sheet of the film unit and a passage through which the film unit may be moved into exposure position. Within this passage is provided a means such as a pair of rollers for moving the film unit into exposure position and distributing the processing liquid carried by said film unit between the photosensitive and other sheets. The rollers are biased toward one another for applying compressive pressure to the film unit during its movement therebetween, and the camera includes means for so rotating the rollers as to advance a film unit inserted between the rollers through the passage into exposure position.

Other objects of the invention are: to provide a novel film pack including a film unit adapted to be advanced through a passage between a pair of pressure-applying members into a camera and a lighttight enclosure means for the film unit from which the film unit may be readily withdrawn into the camera; to provide a film pack of the above type having a leading end portion adapted to be inserted into a passage in a camera for so positioning the leading end of the film unit of said pack between a pair of pressure-applying members as to render said members capable of advancing said film unit from said enclosure means completely within a light-free environment through said passage into exposure position within said camera; and to provide, in a film pack of the above type, a novel enclosure means adapted for use as a mount for exhibiting a photographic transparency produced within the film unit of said film pack.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is an exploded perspective view of an enclosure or envelope comprising the film pack of the invention;

Fig. 2 is a perspective view of one form of film unit of the invention, shown partially in section with parts broken away;

Generally, the film pack of the present invention comprises a film unit and an enclosure or envelope for the film unit. The film unit includes two elements, one of which is photosensitive or has a photosensitive area, and a container mounted adjacent the leading end of the film unit so as to discharge its liquid contents between the photosensitive area of one element and the other element when subjected to compressive pressure. The film unit is mounted within the envelope with the leading end of the film unit extending from the envelope so that it may be inserted between a pair of pressure-applying rollers in a camera and withdrawn thereby from the envelope. The photographic materials useful in the film unit of the invention may be capable of effecting a variety of processes and, in a preferred form of film unit, comprise materials capable of producing a positive silver image by one of the silver transfer-reversal processes. The processing liquid, for example, may comprise an aqueous alkaline solution of a silver halide developer and a silver halide solvent and is adapted to be spread from its container in a layer between a pair of sheets, one of which carries a stratum containing a gelatino silver halide emulsion. Immediately upon distribution of the liquid, the stratum is photoexposed to a subject to be recorded and the reagents in the layer of processing liquid develop the exposed silver halide to silver and react with unexposed silver halide to form a soluble silver complex which, when reduced to silver on one of the sheets or in the layer of liquid, forms a positive print. At least one of the sheets comprising the film unit is transparent so that the photosensitive stratum may be exposed therethrough and the positive image may be formed on the transparent sheet. The film unit of the invention is particularly adapted to the production of photographic transparencies generally of a size, for example, of images produced in conventional 35 mm. film. A film unit of this size may find additional utility when the transparent sheet through which the photosensitive stratum is exposed and on which the visible image is formed is provided with an optical screen, for example one of the lenticular or additive color types. Following spreading of the processing liquid on the photosensitive stratum, the latter is photoexposed through the screen and the resulting print is formed on the transparent sheet or in the layer of liquid in alignment with the screen through which the image is viewed.

Figure 3:
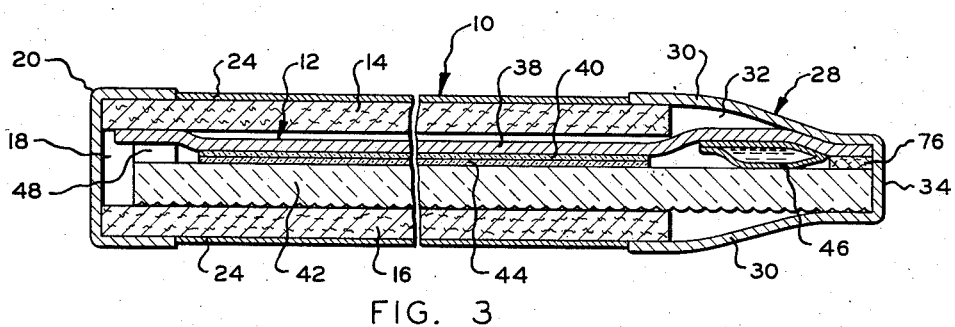
Fig. 3 is a cross-sectional view taken substantially midway between the sides of the film unit of Fig. 2.

One form of film pack, shown in Figs. 1 through 3 and embodying the present invention, comprises an enclosure or envelope generally designated at 10 and a film unit, designated at 12, positioned within envelope 10. The envelope comprises two wall sections 14 and 16, preferably rectangular, secured in facing relation along their margins at a pair of elongated spacing members 18 located in generally parallel relation between the lateral margins of wall sections 14 and 16 so as to provide a chamber of predetermined width and depth within which film unit 12 is position. A channel-shaped strip 20 is secured to the end portions of wall sections 14 and 16 so as to provide a lighttight end wall for the chamber within which the film unit is mounted. Wall sections 14 and 16 may be formed of any suitable rigid opaque sheet material, such as stiff paper or cardboard, spacing members 18 may be formed, for example of cardboard of the desired thickness and channel-shaped strip 20 may be of opaque paper, plastic material, or the like.

Envelope 10 is adapted for use as a mount for protecting and exhibiting a photographic transparency produced in an element of the film unit. For this purpose, walls 14 and 16 are provided with a series of perforations 22 formed therein as shown in a rectangular pattern. Following withdrawal of the film unit from envelope 10, the rectangular portions of walls 14 and 16 defined by the perforations may be removed from the walls with the aid of the perforations so that the remaining marginal portions of walls 14 and 16 form a frame for the transparency positioned therebetween. To prevent the admission of light through the perforations 22, opaque cover sheets 24 may be removably secured to walls 14 and 16 in covering relation to the perforations by an adhesive which permits their being stripped from the walls following withdrawal of the film unit from envelope 10. In another form of film unit shown in Fig. 4, envelope 10 may be provided with an inner envelope 26 of opaque paper surrounding film unit 12. Inner envelope 26 is secured within envelope 10 and is so proportioned that the film unit may be freely withdrawn therefrom while inner envelope 26 remains within envelope 10. Inner envelope 26 may be secured within envelope 10 by an adhesive which permits the inner envelope to be withdrawn therefrom following withdrawal of the film unit. In an alternative form of film unit, walls 14 and 16 may be provided with preferably rectangular apertures formed therein and closed by cover sheets 24 removably secured to the margins of the walls.

As a means for protectively mounting and securing a photographic transparency within the frame formed by envelope 10 after the perforated sections of walls 14 and 16 have been removed, there may be provided with each film pack a pair of transparent sheets of glass or plastic material between which the transparency is sandwiched and the sandwich is inserted into the passage between walls 14 and 16. The thickness of the materials comprising the sandwich may be such that said sandwich is frictionally retained within envelope 10. In an alternative construction of envelope 10 adapted for use as a mount for a transparency, spacing members 18 may be secured to walls 14 and 16 by an adhesive which permits members 18 to be stripped from walls 14 and 16. To employ this embodiment of envelope 10 following withdrawal of a film unit and removal of the perforated sections of walls 14 and 16, the walls are separated, spacing members 18 are removed and the walls adhered together along their lateral margins by the same adhesive previously securing members 18 between the walls. The photographic transparency may then be inserted between walls 14 and 16 and retained therein by friction.

As shown in the drawings, the leading end of film unit 12 extends beyond the open end of envelope 10 and another envelope 28 is provided for preventing exposure of the photosensitive element of the film unit. Envelope 28, adapted to cover the end portion of film unit 12, is substantially shorter than envelope 10 and includes front and rear walls 30 joined together by side walls 32 and an end wall 34. In order to prevent admission of light into envelope 10 and resultant fogging of the photosensitive element, portions of envelope 28 should overlap or extend exteriorly of a portion of at least one opaque envelope in which the film unit is contained. For this purpose, in the embodiment of envelope 10 shown in Fig. 3 wherein walls 14 and 16 are provided with cover sheets 24, the envelope includes two notches 36 formed in the open end of said envelope adjacent opposite sides thereof. The notches 36 extend through the edge portions of walls 14 and 16 and spacing members 18 and are adapted to receive the side walls 32 of envelope 28, thereby allowing envelope 28 to fit over the end of film unit 12 and the edge of envelope 10 and provide a lighttight closure. In the alternative embodiment shown in Fig. 4, envelope 10 includes an inner envelope 26, notches 36 are omitted from envelope 10 and envelope 28 is so proportioned as to extend into envelope 10 in surrounding relation to envelope 26 so as to form a lighttight closure. Envelope 28, formed preferably of opaque paper, is secured to the end portion of film unit 12 and is adapted to be advanced along with the film unit into the camera. It is to be noted that in each of the foregoing embodiments, and one to be described hereinafter, envelope 28 extends around a portion of the envelope in which the film unit is contained.

The embodiment of a film unit 12 employed in the film pack and illustrated in Figs. 2 and 3 comprises a photosensitive sheet including a support 38 and a photosensitive stratum 40, an image-receptive sheet including a support 42 and an image-receptive stratum 44 and a container 46 carrying a processing liquid. The photosensitive stratum 40 preferably comprises a gelatino silver halide emulsion and the image-receptive stratum 44 contains silver precipitating nuclei and is of the type described in Patents Nos. 2,698,237 and 2,698,254, issued to Edwin H. Land on December 28, 1954. Container 46 comprises an elongated sheet of water vapor-impermeable material folded longitudinally with its two sides bonded together along their edges to form a liquid-carrying cavity. The longitudinal edge seal of the container is weaker than the transverse end seals to define a passage adapted to become unsealed and permit the discharge of the processing liquid when compressive pressure is applied to the container. The processing liquid within the container includes a silver halide developer such as hydroquinone, a silver halide solvent such as sodium thiosulfate and a film-forming material such as a water-soluble polymer capable of imparting a predetermined minimum viscosity to the liquid. In another form of the invention, the contents of container 46 may include a sensitizer and/or one or more constituents of a processing composition with other constituents of the processing composition being carried by the other elements of the film unit.

The photosensitive and image-receptive sheets are secured together at their leading ends and container 46 is mounted between the sheets in position to discharge its contents for spreading between the photosensitive and image-receptive strata 40 and 44, respectively, in response to the movement of the film unit, commencing at its leading end, between a pair of pressure-applying members. Support 42 is of a transparent sheet material such as glass or a plastic material and its surface may be provided with an optical screen of the lenticulated or additive color types through which the photosensitive stratum 40 is photoexposed. Support 38 may be of any suitable paper or plastic material and may be opaque or transparent, and the processing fluid is adapted to be spread in a thin layer between the photosensitive and image-receptive strata immediately prior to exposure of the photosensitive stratum. Following spreading of the processing liquid, the photosensitive stratum is photoexposed and a positive image is formed spontaneously in the image-receptive stratum. Thereafter, support 38 is adapted, together with stratum 40 and the layer of processing liquid, to be stripped from the image. In one modification of this film unit, photosensitive stratum 40 may be cast directly on image-receptive stratum 44 with the processing liquid adapted to be spread between stratum 40 and support 38, the latter acting to aid in the distribution of the processing liquid, and following formation of the positive image, aiding in the stripping of the photosensitive stratum from the image-receptive stratum. Alternatively, as disclosed in copending application Serial No. 466,889, filed November 4, 1954, in the name of Edwin H. Land, the covering power of the silver in stratum 44 may be so much greater than the covering power of the silver in stratum 40 that the composite print comprising both the negative of stratum 40 and the positive of stratum 44 is useful without stripping.

To insure that the processing liquid is spread in a layer of uniform predetermined thickness over the entire exposed area of the photosensitive stratum, the liquid is provided in a container 46 in excess of the amount required for the layer of processing liquid. Means are provided for trapping this excess liquid so that it is not forced from between the trailing edges of the sheets into contact with the pressure-applying members. In the form shown, this trapping means comprises a pair of spacing members 48 secured between the photosensitive and image-receptive sheets adjacent the trailing ends and the edges of said sheets. Members 48 are adapted to spread the pressure-applying members apart to provide a space between the end portions of the two sheets in which the excess processing liquid may be retained. In addition, support sheet 38 may extend around the trailing end of the photosensitive sheet to aid in assuring the retention of the excess processing liquid so that it does not contaminate the pressure-applying members.

Figure 4:
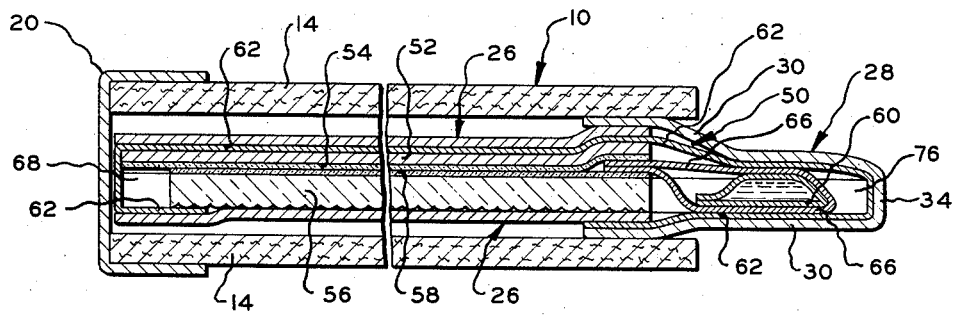
Fig. 4 is a cross-sectional view similar to Fig. 3 of another embodiment of the film unit.
Figure 5:
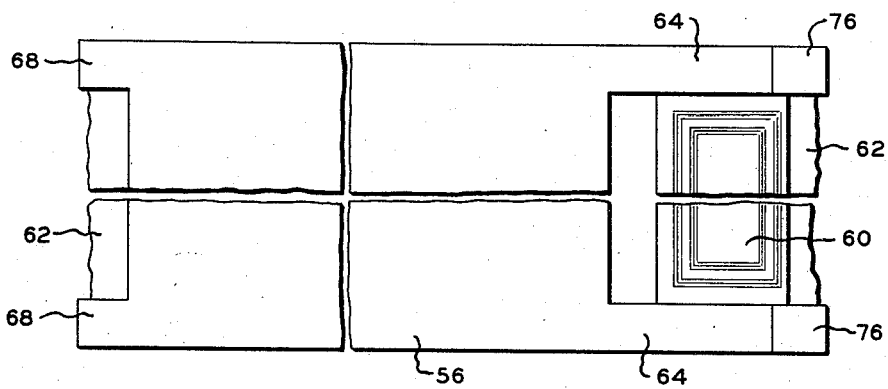
Fig. 5 is a plan view of one component of the film unit of Fig. 4.

Reference is now made to Figs. 4 and 5 wherein there is illustrated another film unit, designated 50, embodying the present invention. Film unit 50 includes a photosensitive sheet comprising a support 52 and a photosensitive stratum 54, an image-receptive sheet comprising a support 56 and an image-receptive stratum 58 and a container 60. This film unit additionally includes a backing sheet 62 formed preferably of a comparatively thin material such as tissue paper secured to the surface of support 56 adjacent its trailing end and extending around the end of the film unit across the surface of support 52 and around the leading end of the film unit across a portion of the surface of support 56 adjacent its leading end. Support 56 is provided with a pair of laterally spaced extended sections 64 which provide a space between the front and rear surfaces of backing sheet 62 at the leading end of the film unit. Container 60 is secured in this space between sections 64 to backing sheet 62 adjacent the leading end of the film unit. To insure a distribution of the processing liquid from container 60 between the photosensitive and image-receptive strata 54 and 58, there is provided around container 60 a single sheet 66 of comparatively thin material folded longitudinally around container 60 with its longitudinal edges extending between stratum 54 and stratum 58 so as to provide a passage through which the processing liquid is directed between the aforementioned strata. As a means for trapping excess processing liquid, support 56 of film unit 50 is provided with a pair of laterally spaced extended sections 68 at its other end. These sections provide a space between backing sheet 62 and the trailing end portion of the photosensitive sheet in which the excess processing liquid is trapped.

Figure 7:
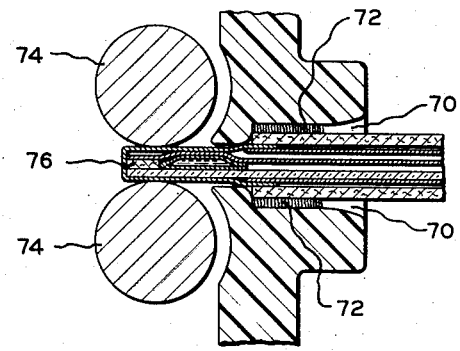
Fig. 7 is a fragmentary cross-sectional view showing the film pack of the invention being introduced into photographic apparatus with which it is adapted to be employed.

The film pack of the present invention is employed as shown in Fig. 7 by introducing its leading end into a passage generally designated at 70 in the wall of photographic apparatus such as a camera. The walls of the passage may be divergent to aid in guiding the film unit during introduction into the apparatus and may be provided with pads 72 of a yielding material such as a pile fabric, flocking or the like, adapted to engage the envelope of the film unit so as to prevent the admission of actinic light into the camera. The film pack is inserted so that the leading end of the film unit extends between a pair of pressure-applying rollers 74 embodied in the camera, the latter including means for spacing rollers 74 apart to permit the insertion of the film unit therebetween. Passage 70 includes a section of sufficient width to allow the introduction of envelope 10 and a narrower section of sufficient width to admit only the narrower film unit. By virtue of this construction, proper positioning of the leading end of the film unit between rollers 74 is assured as well as retention of envelope 10 exteriorly of the apparatus and substantially perfect light sealing. The film unit is advanced from its envelope between rollers 74 into exposure position in the camera and the processing liquid distributed within the film unit by the rotation of rollers 74 in engagement with the film unit. Container 60 is required to be advanced between the rollers during their initial rotation and since the added thickness of and resistance offered by the container may be difficult to overcome during initial rotation of the rollers, means are provided within the film unit for spacing the rollers apart when the leading end of a film unit is positioned between the rollers. In the form shown, this means comprises either a single spacing member, or a pair of spacing members, designated by the numeral 76, secured at the leading end of the film unit between the photosensitive and second sheets or between portions of backing sheet 62. Spacing members 76 are of a thickness calculated to space the pressure-applying rollers apart so that they do not have to "climb" over the edge of the container during their initial rotary movement and extended sections 64 of support 56 continue to retain the rollers apart until the leading end of support 56 passes between the rollers so that the rollers do not have to "climb" over the leading end of the support.

Figure 6:
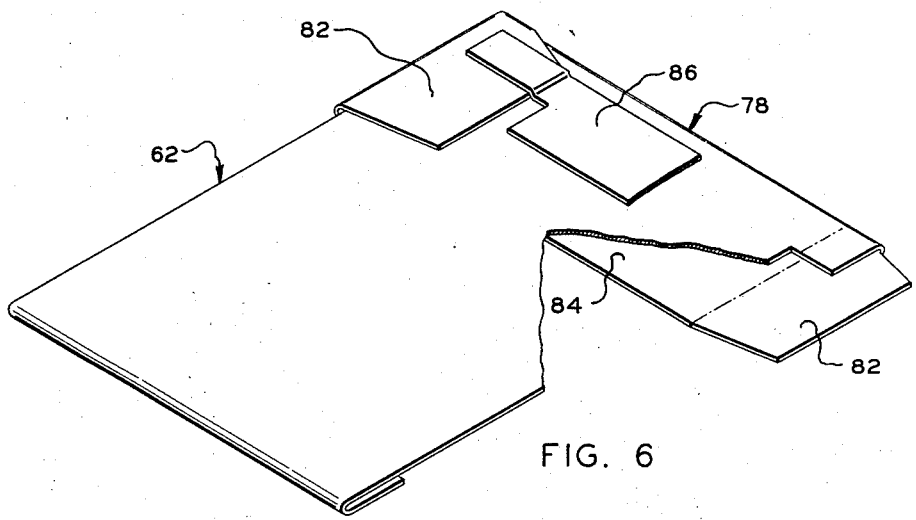
Fig. 6 is a perspective view of another embodiment of a component of the film unit of Fig. 4 showing the method of assemblage.

In another embodiment of film unit 50, backing sheet 62 is formed and assembled as shown in Fig. 6 so as to provide an outer end envelope 78 surrounding the leading end of the film unit and adapted to extend around portions of inner envelope 26. Backing sheet 62, which is elongated and generally rectangular in shape, includes an enlarged end section comprising two lateral flaps 82. The end section of backing sheet 62 is folded around the leading end of the film unit to provide a forward section 84 to which are secured container 60 and extended sections 64 of support 56. Flaps 82 are folded around the sides of the film unit and are secured to the rear (outside) surface of backing sheet 62 adjacent the end of the film unit so as to form envelope 78 having light-tight corners. When film unit 50 is secured within envelope 10, the end sections of inner envelope 26 extend inside of envelope 78 including forward section 84 and flaps 82. Flaps 82 may be secured directly to the surface of backing sheet 62 or, in a preferred form of film unit, flaps 82 may either overlap one another or are secured by a generally T-shaped element 86 so as to add thickness to the film unit in the region of container 60 and thereby insure more complete discharge of the liquid contents of the container when compressive pressure is applied thereto.

As the film unit is withdrawn from the envelope and moved into exposure position, the processing liquid is spread within the film unit and processing of the photosensitive sheet commences. The film unit is photoexposed almost immediately as it comes to rest in exposure position and is allowed to remain in the light-free environment of the camera for a predetermined processing period. In the meantime, the end of envelope 10 may be withdrawn from the passage and prepared for receiving and mounting a finished print by removing the rectangular portions of walls 14 and 16 defined by the perforations and by removing the cover sheets 24 on inner envelope 26. At the end of the predetermined processing period, the camera may be opened, the film unit removed therefrom and the backing and photosensitive sheets stripped from the print in preparation for mounting the print for viewing in the envelope. The finished print may be superposed with a single transparent element or sandwiched between a pair of transparent elements provided for this purpose and inserted into the envelope; or in the alternative form of mounting, the print may be inserted between walls 14 and 16 of an envelope from which spacing members 18 have been removed.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assembly comprising, in combination, a film unit including an element having a light-sensitive stratum, a rupturable container secured to said film unit adjacent said photosensitive stratum and a fluid composition, capable of processing said light-sensitive stratum, releasably carried within said container, a first lighttight envelope for enclosing said film unit, said envelope having light-opaque front, rear and side walls and one end wall and being open at one end and comprising a pair of substantially rigid frame members having apertures substantially coextensive with one another and defining said front and rear walls, means for securing said frame members together in facing relation a fixed distance apart at their lateral margins and at one end margin to provide a space between said frame members for said film unit, and light-opaque cover means removably secured to said frame members at least across said apertures therein for closing said apertures and forming said envelope, said film unit being located within said envelope between said frame members and said cover means with an end portion thereof projecting from said envelope through the open end thereof, and a second envelope secured to said film unit in surrounding relation to said end portion and disposed in overlapping lighttight engagement with said first envelope in the region of said open end thereof for preventing the admission of light into said envelope.

2. In a photographic film assembly as described in claim 1 wherein said container is secured to said end portion, a spacing element secured to said end portion of said film unit between said container and the edge of said end portion.

3. A photographic film assembly as described in claim 1 wherein said means for securing said frame members in facing relation comprise spacing members, at least equal in thickness to said film unit, secured between at least the lateral margins of said frame members for spacing said frame members apart to provide said space.

4. A photographic film assembly as described in claim 1 wherein said second envelope is substantially narrower than said frame members and extends outside of portions of said front and rear walls of said first envelope in the region of said open end.

5. A photographic film assembly comprising, in combination, a film unit including an element having a photosensitive stratum, a rupturable container secured to said element adjacent the leading end of said film unit and a fluid composition, capable of processing said photosensitive stratum, releasably carried within said container, a first lighttight envelope for enclosing said film unit, said envelope being open at one end and including front, rear and side walls and one end wall, said walls comprising a pair of substantially rigid frame members, having apertures substantially coextensive with one another, means for securing said frame members in facing relation a substantially fixed distance apart at their lateral margins and at one end margin to provide a space between said frame members for said film unit, and cover means secured to said frame members at least across said aperture therein for closing said apertures and forming said first envelope open at one end, said film unit being located within said envelope between said frame members and said cover means with said leading end projecting from said envelope through the open end thereof, and a second envelope secured around the leading end of said film unit and engaged in surrounding relation with said first envelope in the region of said open end for preventing the admission of light into said first envelope.

6. A photographic film assembly comprising, in combination, a first envelope adapted to be employed as a mount for a photographic print produced from an element of said film pack, said envelope comprising front, rear and side walls and an end wall providing a compartment open at one end, said walls comprising a pair of substantially rigid wall members having apertures substantially coextensive with one another, means for securing said wall members in facing relation a substantially fixed distance apart at their lateral margins and at one end margin to provide a space between said wall members for a film unit, and auxiliary walls secured to said wall members at least across said apertures for closing said apertures, a film unit removably mounted within said compartment with its leading end projecting from said open end of said first envelope, said film unit comprising an element having a photosensitive stratum, a rupturable container secured to the leading end portion of said film unit adjacent one edge of said photosensitive stratum and a fluid composition, capable of processing said photosensitive stratum, releasably carried within said container, and a second envelope secured to said film unit in surrounding relation to said leading end portion thereof, said second envelope being located in surrounding engagement with portions of said front, rear and side walls of said first envelope in the region of said open end to prevent the admission of light into said first envelope.

7. A photographic film assembly comprising, in combination, a generally rectangular film unit including an element having a photosensitive stratum, a rupturable container secured to the leading end portion of said film unit adjacent an edge of said stratum and a fluid composition, capable of processing said photosensitive stratum, releasably carried within said container, a first lighttight envelope for enclosing said film unit, said envelope including front, rear and side walls and one end wall providing a compartment open at one end, said walls comprising a pair of substantially rigid wall members having centrally located rectangular apertures substantially coextensive with one another, means for securing said wall members in facing relation and substantially a fixed distance apart at their lateral margins and at one end margin bordering said apertures to provide a space between said wall members for said film unit, said wall members being secured in facing relation with said apertures located in substantial alignment, and flexible auxiliary walls secured to said wall members at least across said apertures for closing said apertures and forming said first envelope open at one end, said film unit being located within said envelope between said wall members and said auxiliary walls with said leading end projecting from said envelope through the open end thereof, and a second envelope secured to said film unit in surrounding relation to said leading end portion thereof, said second envelope being located in surrounding engagement with portions of said front, rear and side walls of said first envelope in the region of said open end to prevent the admission of light into said first envelope.

8. A photographic film assembly as described in claim 7 and including at least a spacing element secured to said leading end portion of said film unit between said container and the edge of said leading end portion.

9. A photographic film assembly as described in claim 7 wherein said means for securing said wall members in facing relation comprise spacing members, at least equal in thickness to said film unit, secured between the lateral margins and said one end margin of said wall members for spacing said wall members apart to provide said compartment.

10. A photographic film assembly as described in claim 7 wherein said second envelope is substantially narrower than said wall members and extends outside of portions of said front and rear walls in the region of said open end.

11. A photographic film assembly comprising, in combination, a first envelope adapted to be employed as a mount for a photographic print produced from an element of said film pack, said envelope comprising, front, rear and side walls and an end wall providing a compartment open at one end, said walls comprising a pair of substantially rigid wall members having central apertures substantially coextensive with one another, spacing members located between the lateral margins and one end margin of said wall members for securing said wall members in facing relation to provide a space between said members for a film unit, and auxiliary walls secured to said wall members at least across said apertures for closing said apertures, a film unit removably mounted within said compartment between said spacing members with its leading end projecting from said open end of said first envelope, said film unit comprising an envelope having a photosensitive stratum, a rupturable container secured to the leading end portion of said film unit adjacent one edge of said photosensitive stratum and a fluid composition, capable of processing said photosensitive stratum, releasably carried within said container, said wall members having a pair of slots formed in their marginal portions adjacent the open end of said envelope and extending from the edges of said wall members toward the closed end of said envelope, said slots extending through said spacing members, and a second envelope secured to said film unit in surrounding relation to said leading end portion thereof, said second envelope including front and rear walls joined together in facing relation by side walls, said front and rear walls extending in engagement with exterior portions of the front and rear walls of said first envelope and said side walls of said second envelope extending into said slots.

12. A photographic film assembly comprising, in combination, a first envelope adapted to be employed as a mount for a photographic print produced from an element of said film pack, said envelope comprising front, rear and side walls and an end wall providing a compartment open at one end, said walls comprising a pair of substantially rigid wall members having generally coextensive apertures and means securing said wall members in facing relation at their lateral margins and at one end margin to provide said compartment, a second envelope secured within said first envelope for rendering said first envelope lighttight, a film unit removably mounted within said second envelope within said compartment with its leading end projecting from said first and second envelopes, said film unit comprising an element having a photosensitive stratum, a rupturable container secured to the leading end portion of said film unit adjacent one edge of said photosensitive stratum and a fluid composition, capable of processing said photosensitive stratum, releasably carried within said container, and a third envelope secured to said film unit in surrounding relation to said leading end portion thereof, said third envelope being substantially narrower than said first envelope and being located in surrounding engagement with portions of said second envelope in the region of said open end to prevent light reaching portions of said film unit within said second envelope.

References Cited in the file of this patent

UNITED STATES PATENTS

| | | |
|---|---|---|
| 2,624,253 | Fairbank | Jan. 6, 1953 |
| 2,689,306 | Land | Sept. 14, 1954 |
| 2,740,714 | Bachelder et al. | Apr. 3, 1956 |